United States Patent
Alexander et al.

(10) Patent No.: US 8,082,467 B2
(45) Date of Patent: Dec. 20, 2011

(54) TRIGGERING WORKAROUND CAPABILITIES BASED ON EVENTS ACTIVE IN A PROCESSOR PIPELINE

(75) Inventors: Gregory W. Alexander, Pflugerville, TX (US); Fadi Busaba, Poughkeepsie, NY (US); David A. Schroter, Round Rock, TX (US); Eric Schwarz, Gardiner, NY (US); Brian W. Thompto, Austin, TX (US); Wesley J. Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 12/645,771

(22) Filed: Dec. 23, 2009

(65) Prior Publication Data

US 2011/0154107 A1  Jun. 23, 2011

(51) Int. Cl.
*G06F 11/00* (2006.01)
(52) U.S. Cl. ............................. 714/10; 714/39
(58) Field of Classification Search ....................... 714/10
See application file for complete search history.

(56) References Cited

U.S. PATENT DOCUMENTS

| | | | |
|---|---|---|---|
| 4,604,684 A | 8/1986 | Epstein | |
| 4,853,840 A | 8/1989 | Shibuya | |
| 4,858,104 A | 8/1989 | Matsuo et al. | |
| 4,873,629 A | 10/1989 | Harris et al. | |
| 5,073,855 A | 12/1991 | Staplin et al. | |
| 5,150,468 A | 9/1992 | Staplin et al. | |
| 5,434,985 A | 7/1995 | Emma et al. | |
| 5,500,947 A | 3/1996 | Uhler et al. | |
| 5,666,506 A | 9/1997 | Hesson et al. | |
| 5,694,565 A | 12/1997 | Kahle et al. | |
| 5,706,490 A * | 1/1998 | Beard et al. | 712/234 |
| 5,717,910 A | 2/1998 | Henry | |

(Continued)

FOREIGN PATENT DOCUMENTS

EP            378816           12/1989

(Continued)

OTHER PUBLICATIONS

Michael J, Flynn. Instruction Sets and Their Implementations. IEEE.. EE Department, CSL. Stanford, CA. Dec. 27 to Dec. 29, 1990.

(Continued)

*Primary Examiner* — Scott Baderman
*Assistant Examiner* — Kamini Patel
(74) *Attorney, Agent, or Firm* — Jon A. Gibbons; Fleit Gibbons Gutman Bongini & Bianco PL

(57) ABSTRACT

A novel system and method for working around a processing flaw in a processor is disclosed. At least one instruction is fetched from a memory location. The instruction is decoded. A set of opcode compare logic, associated with an instruction decode unit and/or a set of global completion table, is used for an opcode compare operation. The compare operation compares the instruction and a set of values within at least one opcode compare register in response to the decoding. The instruction is marked with a pattern based on the opcode compare operation. The pattern indicates that the instruction is associated with a processing flaw. The pattern is separate and distinct from opcode information within the instruction that is utilized by the set of opcode compare logic during the opcode compare operation.

21 Claims, 6 Drawing Sheets

U.S. PATENT DOCUMENTS

| | | | |
|---|---|---|---|
| 5,742,805 A | 4/1998 | Kulkarni et al. | |
| 5,752,273 A | 5/1998 | Nemirovsky et al. | |
| 5,781,752 A | 7/1998 | Moshovos et al. | |
| 5,826,089 A | 10/1998 | Ireton | |
| 5,867,684 A | 2/1999 | Kahle et al. | |
| 5,909,567 A | 6/1999 | Novak et al. | |
| 6,000,044 A * | 12/1999 | Chrysos et al. | 714/47 |
| 6,092,185 A * | 7/2000 | Slegel et al. | 712/219 |
| 6,134,646 A | 10/2000 | Feiste et al. | |
| 6,219,742 B1 | 4/2001 | Stanley | |
| 6,336,183 B1 | 1/2002 | Le et al. | |
| 6,484,314 B1 * | 11/2002 | Ishizaki et al. | 717/151 |
| 6,516,408 B1 * | 2/2003 | Abiko et al. | 712/227 |
| 6,654,869 B1 | 11/2003 | Kahle et al. | |
| 6,697,939 B1 | 2/2004 | Kahle | |
| 6,999,952 B1 | 2/2006 | Pham | |
| 7,082,517 B2 | 7/2006 | Busaba et al. | |
| 7,085,917 B2 | 8/2006 | Busaba et al. | |
| 7,159,102 B2 | 1/2007 | Irie et al. | |
| 7,162,621 B2 | 1/2007 | Kissell | |
| 7,269,715 B2 | 9/2007 | Le et al. | |
| 7,383,540 B2 * | 6/2008 | Kalra | 717/129 |
| 7,434,035 B2 * | 10/2008 | Busaba et al. | 712/226 |
| 7,493,473 B2 * | 2/2009 | Pappalardo et al. | 712/208 |
| 7,761,855 B2 * | 7/2010 | Kalra | 717/129 |
| 2002/0152259 A1 | 1/2002 | Trong et al. | |
| 2004/0230777 A1 * | 11/2004 | Busaba et al. | 712/226 |
| 2005/0132338 A1 * | 6/2005 | Kalra | 717/129 |
| 2005/0223292 A1 | 10/2005 | Lee et al. | |
| 2006/0053343 A1 * | 3/2006 | Hayem | 714/39 |
| 2008/0244243 A1 * | 10/2008 | Kalra | 712/225 |
| 2008/0313431 A1 * | 12/2008 | Busaba et al. | 712/205 |
| 2009/0210659 A1 * | 8/2009 | Carlough et al. | 712/205 |
| 2009/0240914 A1 | 9/2009 | Malley et al. | |
| 2009/0240949 A9 | 9/2009 | Alexander et al. | |

FOREIGN PATENT DOCUMENTS

| | | |
|---|---|---|
| EP | 374830 A3 | 3/1992 |
| JP | 2000259408 A | 9/2000 |
| JP | 2001229024 A2 | 8/2001 |
| JP | 2004342102 A2 | 12/2004 |

OTHER PUBLICATIONS

Michael Gschwind and Kemal Ebcioglu and Erik Altman and Sumedh Sathaye. Binary Translation and Architecture Convergence Issues for IBM System/390. In Preceedings of ICS-2000 Sante Fe, New Mexico, Aug. 8-10, 2000.

Abraham Ziv and Merav Aharoni and Sigal Asaf. Solving Range Constraints for Binary Floating Instructions. Haifa University. 2003. International Business Machines Research Labs. Haifa, Israel.

Fadi Busaba and Timothy Slegel and Steven Carlough and Christopher Krygowski and John G. Rell. The Design of the Fixed Point Unit for z990 Microprocessor. GLSVLSI' 04. 2004. Boston.

Gideon D, Intrater and Ilan Y. Spikkinger. Performance Evaluation of a Decoded Instruction Cache for Variable Instruction Length Computers. IEEE. Oct. 2004.

Gang Quan and James P. Davis and Siddhaveerasharan Devarkal and Duncan A . Buell. High Level Synthesis for Large Bit Width Multipliers on FPGAS: A Case Study. Codes+ISSS' 05. 2005. New Jersey.

Jose Rizo Morente and Miguel Casas-Sanchez and C.J. Bleakley. Dynamic Current Modeling at the Instruction Level. ISLPED' 06. 2006. Tegemsee, Germany.

Smruti R. Sarangi and Abhishek Tiwari and Josep Torrellas, Phoenix: Detecting and Recovering from Permanent Processor Design Bugs with Programmable Hardware, Proc. Ann. IEEE/ACM International Symposium. 2006, Microarchitecture (Micro 06), IEEE CS Press.

* cited by examiner

TRIGGERING WORKAROUND CAPABILITIES BASED ON EVENTS ACTIVE IN A PROCESSOR PIPELINE

FIELD OF THE INVENTION

The present invention generally relates to information processing systems, and more particularly relates to processors that use configurable hardware events to work around flaws that exist in the hardware design.

BACKGROUND OF THE INVENTION

Modern microprocessors grow in complexity from generation to generation due to increasing functionality and performance as required by their consumers. As more functions are added, and more micro-architectural features are added, the processors become more susceptible to design flaws that might not be caught in simulation verification before designs are built into actual hardware. As it costs both time and money to rebuild hardware to fix such design flaws, it is becoming more economic to have some built-in capability to workaround design flaws if one is found. However most conventional workaround mechanisms are not designed to effectively pair instructions in a processor that performs out-of-order processing.

SUMMARY OF THE INVENTION

In one embodiment, a method for working around a processing flaw in a processor is disclosed. The method comprises fetching at least one instruction from a memory location. The at least one instruction is decoded. A set of opcode compare logic, associated with an instruction decode unit and/or a set of global completion table, is used for an opcode compare operation. The compare operation compares the at least one instruction and a set of values within at least one opcode compare register in response to the decoding. The instruction is marked with a pattern based on the opcode compare operation. The pattern indicates that the instruction is associated with a processing flaw. The pattern is separate and distinct from opcode information within the instruction that is utilized by the set of opcode compare logic during the opcode compare operation.

In another embodiment, an information processing system for working around a processing flaw in a processor is disclosed. The information processing system comprises a memory and a processor that communicatively coupled to the memory. The processor comprises an instruction fetching unit that fetches at least one instruction from a memory location. The processor further comprises an instruction decoding unit. The instruction decoding unit decodes the at least one instruction. A set of opcode compare logic, associated with an instruction decode unit and/or a set of global completion table, is used for an opcode compare operation. The opcode compare logic performs, in response to the at least one instruction being decoded, an opcode compare operation with the at least one instruction and a set of values within at least one opcode compare register. The instruction decoding unit marks, based on the opcode compare operation, the instruction with a pattern. The pattern indicates that the instruction is associated with a processing flaw. The pattern is separate and distinct from opcode information within the instruction that is utilized by the set of opcode compare logic during the opcode compare operation.

In yet another embodiment, a processor for working around a processing flaw is disclosed. The processor comprises at least an instruction fetching unit, an instruction decoding unit, and at least one execution unit. The instruction fetching unit fetches at least one instruction from a memory location. The instruction decoding unit decodes the at least one instruction. A set of opcode compare logic, associated with an instruction decode unit and/or a set of global completion table, is used for an opcode compare operation. The opcode compare logic performs, in response to the at least one instruction being decoded, an opcode compare operation with the at least one instruction and a set of values within at least one opcode compare register. The instruction decoding unit marks, based on the opcode compare operation, the instruction with a pattern. The pattern indicates that the instruction is associated with a processing flaw. The pattern is separate and distinct from opcode information within the instruction that is utilized by the set of opcode compare logic during the opcode compare operation.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Operating Environment

Figure 1:
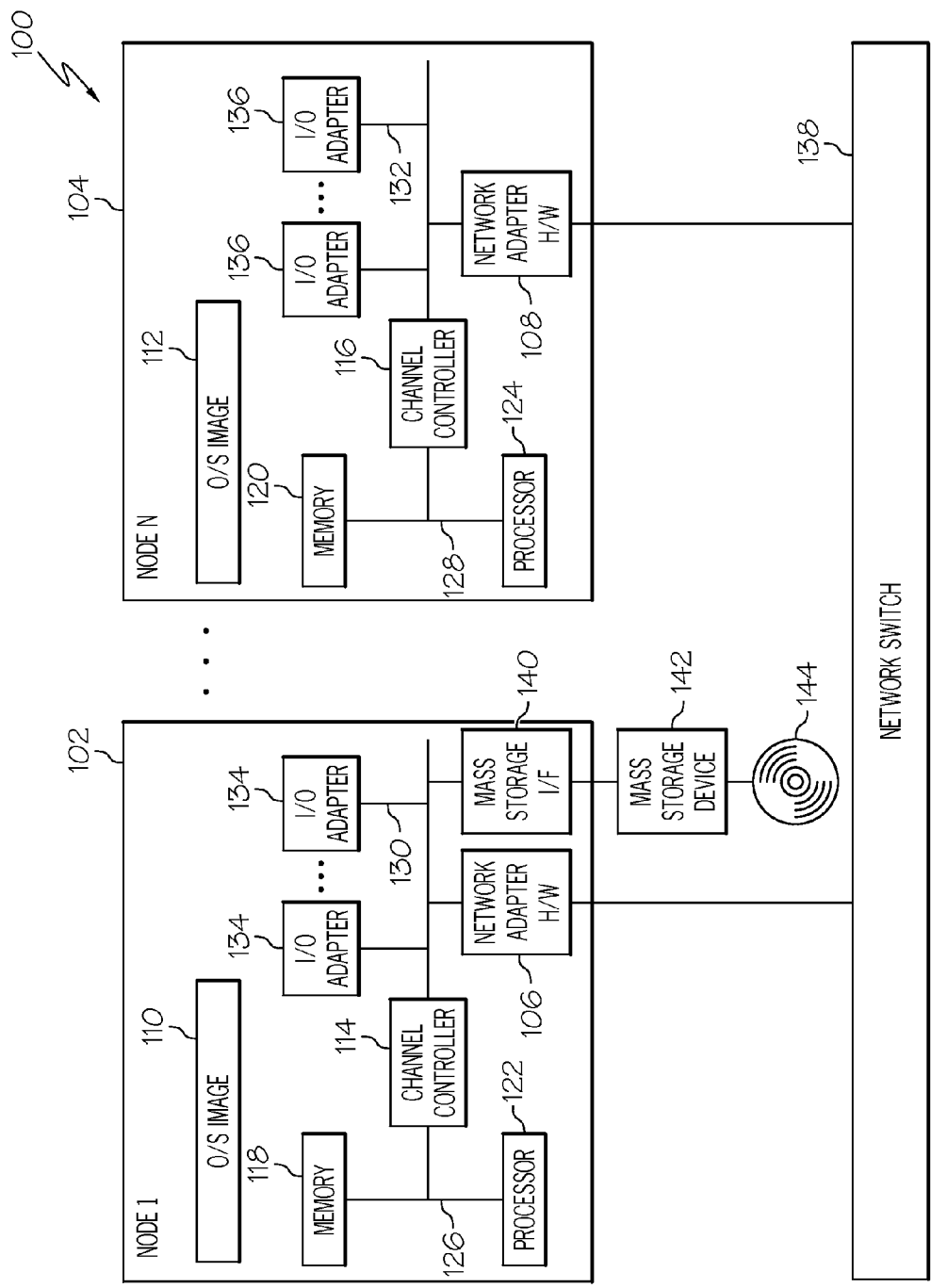
FIG. 1 is a block diagram illustrating one example of an operating environment according to one embodiment of the present invention.

FIG. 1 shows an exemplary operating environment applicable to various embodiments of the present invention. In particular, FIG. 1 shows a parallel-distributed processing system in which one embodiment of the present invention is implemented. In this embodiment, the parallel-distributed processing system 100 operates in an SMP computing environment. In an SMP computing environment, parallel applications can have several tasks (processes) that execute on the various processors on the same processing node. The parallel-distributed processing system 100 executes on a plurality of processing nodes 102 and 104 coupled to one another node via a plurality of network adapters 106 and 108. Each processing node 102 and 104 is an independent computer with its own operating system image 110 and 112, channel controller 114 and 116, memory 118 and 120, and processor(s) 122 and 124 on a system memory bus 126 and 128. A system input/output bus 130 and 132 couples I/O adapters 134 and 136 and communication adapter 106 and 108. Although only one processor 122 and 124 is shown in each processing node 102 and 104 for simplicity, each processing node 102 and 104 can have more than one processor. The communication adapters are linked together via a network switch 138.

Also, one or more of the nodes 102, 104 comprises mass storage interface 140. The mass storage interface 140 is used to connect mass storage devices 142 to the node 102. One specific type of data storage device is a computer readable medium such as a Compact Disc ("CD") drive, which may be used to store data to and read data from a CD 144 or DVD. Another type of data storage device is a hard disk configured to support, for example, JFS type file system operations. In some embodiments, the various processing nodes 102 and 104 are able to be part of a processing cluster. The present invention is not limited to an SMP environment. Other architectures are applicable as well, and further embodiments of the present invention can also operate within a single system.

Processor Core

Figure 2:
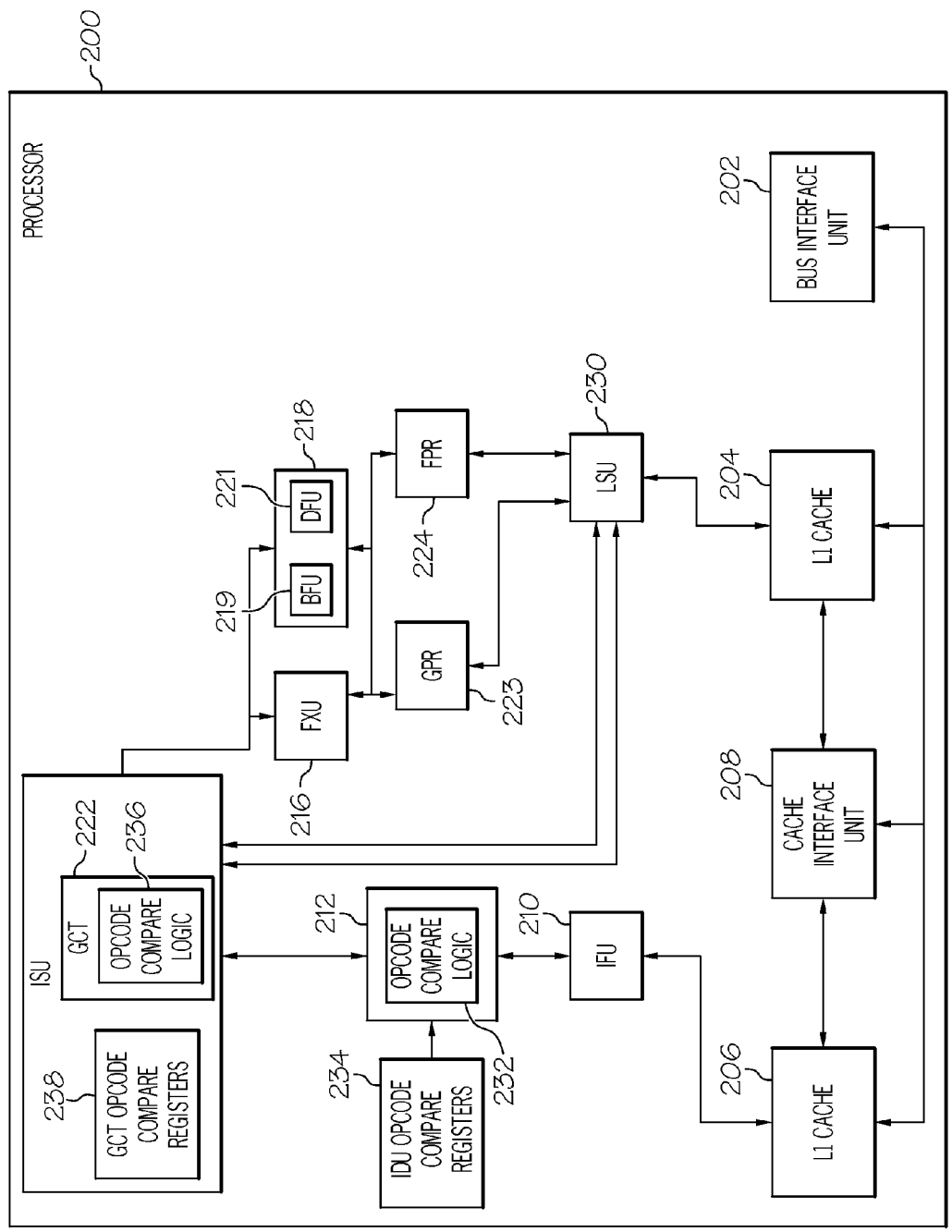
FIG. 2 is a block diagram illustrating a detailed view of a processing core according to one embodiment of the present invention.

According to one embodiment, FIG. 2 illustrates one example of a processor core 200 within a processor 122, 124 for performing workaround operations based on active events in the processor pipeline. It should be noted that the configuration shown in FIG. 2 is only one example applicable to the presently claimed invention. In particular, FIG. 2 shows a processing core 200. The processor core 200, in one embodiment, comprises a bus interface unit 202 that couples the processor core 200 to other processors and peripherals. The bus interface unit 202 also connects L1 Dcache 204, which reads and stores data values, L1 Icache 206, which reads program instructions, and a cache interface unit 208 to external memory, processor, and other devices.

The L1 Icache 206 provides loading of instruction streams in conjunction with an instruction fetch unit IFU 210, which prefetches instructions and may include speculative loading and branch prediction capabilities. These fetched instruction codes are decoded by an IDU 212 into instruction processing data. Once decoded, the instructions are dispatched to an instruction sequencer unit (ISU) 214. The ISU controls sequencing of instructions issued to various execution units such as one or more fixed point units (FXU) 216 for executing general operations and one or more floating point units (FPU) 218 for executing floating point operations. The floating point unit(s) 218 can be a binary point floating unit 219, a decimal point floating unit 221, and/or the like. It should be noted that the FXU(s) 216, in one embodiment, comprises multiple FXU pipelines, which are copies of each other. The ISU 214 is also coupled to one or more load/store units (LSU) pipelines. These multiple LSU pipelines are treated as execution units for performing loads and stores and address generation for branches.

A set of global completion tables (GCT) 222 residing within the ISU 214 track the instructions issued by ISU 214 via tags until the particular execution unit targeted by the instruction indicates the instructions have completed execution. The FXU 216 and FPU 218 are coupled to various resources such as general-purpose registers (GPR) 223 and floating point registers (FPR) 224. The GPR 223 and FPR 224 provide data value storage for data values loaded and stored from the L1 Dcache 204 by a load store unit (LSU) 230.

In addition, to the configuration of the processor core 200 discussed above, in one embodiment, the IDU 212 comprises opcode compare logic 232 and is coupled to IDU opcode compare registers 234. Also, the GCT 222, in one embodiment, also comprises opcode compare logic 236 coupled to GCT opcode compare registers 238. It should be noted that one embodiment comprises a configuration with both the IDU and GCT opcode compare logic, while one or more other embodiments comprise one of the IDU and GCT opcode compare logic.

Therefore, various embodiments of the present invention implement opcode compare logic at the beginning (e.g., IDU 212) and/or the end (e.g., GCT 222) of the processor core pipeline. One or more embodiments mark instructions with one or more patterns and track the instructions through various stages of a pipeline via these patterns. This allows for instructions that are executed out of order and that are problematic to be tracked and paired.

Throughout this disclosure, a pattern is referred to as a color for illustration purposes only. Any type of pattern can be used to mark and track an instruction in a pipeline. An opcode compare register can determine at decode time that a particular instruction is colored red, yellow, blue, or green and then an action can be taken when a single color reaches a stage in the pipeline or a pairing of colors occurring in the pipeline at the same or a delta of stages apart.

The various embodiments track if a color, i.e., a pattern, is active anywhere from issue to completion. This provides an efficient method for working around pairs of instructions that may cause a problem. For instance, if an out-of-order processor has a problem when a Load instruction and Store Floating-Point Control word instruction are active at the same time, the opcode compare logic of one or more embodiments can "color" the first instruction red and the second instruction blue. The system registers can be initialized at IML time or through a dynamical load of system registers at the system console. This changes the value of the registers in the LSU to detect that both red and blue colors are active at the same time and trigger an XCOND immediately into slow mode, where in slow mode each instruction is issued by itself which will avoid the defect. This provides dynamic capabilities to workaround problems after the machine ships and is installed in a customer environment. An XCOND is an immediate reset condition that cancels all current execution and restores the processor to the last completed, checked, and saved state. After resetting the processor via XCOND, the next several instructions can be issued in a normal mode, scalar mode, or slow mode where normal refers to super-scalar and super pipelined, scalar mode refers to one instruction issue per cycle but pipelined, and slow mode refers to single instruction issue and not pipelined with other instructions. The IDU and GCT opcode compare logic is discussed in greater detail below.

Triggering Workarounds Based on Events Active in a Pipeline

The following is a discussion of performing workarounds based on events active in pipeline using opcode compare logic at the IDU and/or the GCT. In one embodiment, the IFU 210 fetches blocks of data from a cache 206 or main storage and presents it to the IDU 212. In one example, the IFU 210 sends three instructions at a time to the IDU 212. However any number of instructions can be passed to the IDU 212. The IDU decodes these fetched instructions into instruction processing data. The opcode compare logic 232 of the IDU compares each these instruction with values stored in the opcode compare registers 234 to determine if the opcode of a compared instruction matches the values within the opcode compare registers 234. In one embodiment, the opcode compare registers 234 comprise two sets of compares per 64-bit register referred to as Opcode A information and Opcode B information. Table 1 below shows one example of Opcode A information and Opcode B information. In particular, Table 1 shows examples of various bit assignments for a 64-bit word in the opcode compare registers 234.

TABLE 1

| Bits | Value | Mnemonic |
|---|---|---|
| Opcode A | | |
| 0:11 | | 12-bit internal Opcode A |
| 12:23 | | 12-bit mask for Opcode A |
| 24:27 | | Opcode A Action |
| | 0000 | No action (control trace only) |
| | 0001 | Force priors |
| | 0010 | Force NTC |
| | 0011 | Force XCOND before, into slow mode |
| | 0100 | Force Futures |
| | 0101 | Force Priors and Futures |
| | 0110 | Force NTC and Futures |
| | 0111 | Force XCOND after |
| | 1000 | Delay Issue |
| | 1001 | Force Priors and Delay Issue |
| | 1010 | Generate Red Mark |
| | 1011 | Generate Blue Mark |
| | 1100 | Delay Issue and Force Futures |
| | 1101 | Delay Issue and Force Futures and Priors |
| | 1110 | Generate Green Mark |
| | 1111 | Force to Millicode, not performed in millimode |
| 28 | | trace start/stop function for Opcode A |
| 29 | | disable Opcode A action in slow mode, default is Action allowed in both fast and slow mode |
| 30:31 | 00 | do action on all uops |
| | 01 | do action on pipe0 |
| | 10 | do action on pipe1 |
| | 11 | do action on pipe2 |
| Opcode B | | |
| 32:43 | | 12-bit internal Opcode B |
| 44:55 | | 12-bit mask for Opcode B |
| 56:59 | | Opcode B action |
| | 0000 | No action (control trace only) |
| | 0001 | Force priors |
| | 0010 | Force NTC |
| | 0011 | Force XCOND before, into slow mode |
| | 0100 | Force Futures |
| | 0101 | Force Priors and Futures |
| | 0110 | Force NTC and Futures |
| | 0111 | Force XCOND after |
| | 1000 | Delay Issue, ISU M2 Hold |
| | 1001 | Force Priors and Delay Issue |
| | 1010 | Generate Red Mark |
| | 1011 | Generate Blue Mark |
| | 1100 | Delay Issue and Force Futures |

TABLE 1-continued

| Bits | Value | Mnemonic |
|---|---|---|
| | 1101 | Delay Issue and Force Futures and Priors |
| | 1110 | Generate Green Mark |
| | 1111 | Force to Millicode, not performed in millimode |
| 60 | | trace start/stop function for Opcode B |
| 61 | | |
| 62:63 | 00 | do action on all uops |
| | 01 | do action on pipe0 |
| | 10 | do action on pipe1 |
| | 11 | do action on pipe2 |

In one embodiment, the opcode compare logic 232 indicates a "hit" when an instruction having either opcode A or opcode B is present. In another embodiment, the opcode compare logic 232 indicates a hit when both an instruction having opcode A and an instruction having opcode B is present. In the embodiment where the IDU 212 receives three instructions at a time from the IFU 210, three opcode A, B compares are performed in the IDU 210. A hit on opcode A and/or opcode B results in an action being taken as indicated by bits 24:27 and 56:59, respectively. A different action is taken depending on the instruction's value at bits 24:27 and/or 56:59. For example, the IDU 212 can perform an action on one or more of the three instructions such as forcing priors and/or associating the instruction with a given pattern, e.g., red, green, blue mark. By associating a pattern with an instruction early in the pipeline, i.e., at the IDU 210, problematic instruction pairs can be identified and handled later on when executed out of order.

If a hit is not identified by the opcode compare logic 232 conventional processing takes place. When a hit is identified the IDU 212 either takes an action on an instruction or marks an instruction. The instructions are then sent from the IDU 212 to the ISU 214 for queuing and issuing to the proper execution unit 216, 218, 220, 230. It should be noted that the instructions are still in order when received by the ISU 214. When queued, the instructions can be executed out-of-order. In conventional systems, this out-of-order execution is problematic for working around processor design flaws. For example, when a pair of instructions is determined to be a problematic pair based on opcode comparisons, these pairs generally cannot be tracked by conventional systems when the problematic instruction pair is executed out-of-order. However, because of the marking discussed above, one or more embodiments of the present invention are able to identify these problematic instructions throughout the various stages of the pipeline even when executed out of order.

For example, as the ISU 214 issues an instruction to an execution unit such as the BFU 219, an encoded signal from the IDU 212 is also sent as well. This encoded signal informs the BFU 219 of the mark associated with the instruction. The execution unit, e.g., the BFU 219 in this example, comprises a set of internal registers such as a scan only latch that comprise a set of actions that are to be taken based on a given mark associated with an instruction, a combination of marks associated with two or more instructions, and/or various conditions associated with the instruction(s).

For example, with respect to a BFU execution unit 219, the BFU 219 receives an instruction from the ISU 214 and also receives an encode signal associated with the signal from the IDU 212 via the ISU 214. This encoded signal can indicate the pattern associated with the instruction such as, but not limited to, 00 or red (no action to be taken), 01 or blue (mark 1), 10 or green (mark 2), and 11 or yellow (mark 3). The BFU 219 analyzes its internal registers to identify an appropriate workaround action to take for an instruction with a given mark. For example, the BFU 219 can determine stop the operation of the instruction and force to millicode, perform an XCOND, or the like. In one embodiment, the workaround action modifies a default processor behavior associated with the instruction.

In one embodiment, the BFU 219 monitors for pairs of marked instructions using the encoded signal received from the IDU 212 that identifies the mark of an instruction. Stated differently, the BFU 219 monitors for pairs of instructions being executed at various stages in the pipeline with given a pair of marks. For example, the BFU 219 monitors for an instruction have a first mark such as a red mark being followed by an instruction having a second mark such as a blue mark. In other example, the BFU 219 monitors for an instruction have a first mark such as a blue mark being followed by an instruction having a second mark such as a green mark These parings can occur in back-to-back (1 cycle difference) executions of the two instructions or in a result forwarded situation. When a given pairing is identified, as indicated by the internal register of the BFU 219, one or more workaround actions can be performed.

In addition, to performing a workaround action based only on identifying a mark or a pair of marks, the BFU 219 can be configured to identify one or more given conditions that are to occur for an instruction with a given mark prior to taking a workaround action. For example, conditions can be that an instruction(s) with a given mark needs to be associated with a given operand value, have a given intermediate result, have a given intermediate result size, the instruction forwards its operand, and/or the like. These conditions can be programmable. When a specified condition is met one or more given workaround actions can be performed such as canceling the operation of the instruction and forcing it to millicode. For example, one or more embodiments statically setup that when an instruction that has been marked such as a multiply instruction with a blue mark goes through the pipeline with a dynamically small number a specific action can be taken by the BFU 219.

In addition conditions can be defined as to how a pair of instructions occurs in the pipeline or how the instructions in a pair interact with each other. For example, a condition can be defined as when mark1 (e.g., red) and mark2 (e.g., blue) are in the pipeline at back-to-back cycles (or any given number of cycles as specified); when mark2 forwards its result to mark1 (red); and similar conditions for marks mark2 (red) and mark3 (blue). Based on these conditions one or more given workaround actions can be triggered.

With respect to a DFU execution unit 221, the DFU 221 receives an instruction from the ISU 214 and also receives an encode signal associated with the signal from the IDU 212 via the ISU 214. This encoded signal can indicate the pattern associated with the instruction. In one embodiment, the DFU 221 performs one or more workaround actions based on detecting an instruction with a given pattern such as red, green, blue. These work around actions can vary, but a few examples are forcing to millicode and performing an XCOND to slowmode.

Also, each of these patterns can have conditions associated within them similar to those discussed above with respect to the BFU 219. If an instruction with a given pattern is detected and one or more conditions associated with this instruction are satisfied then one or more workaround actions are triggered, as discussed above. Each of the three marks discussed above is associated with a separate workaround triggering signal. Examples of conditions for the BFU 219 are true, OF detected—overflow, greater than maximum exponent; UF detected—underflow, less than minimum exponent; special input (NaN/0/inf) where NaN is Not a number, 0 is a positive or negative zero value, and Inf is infinity); new rounding mode-round to odd value; and a flush or reject occurred, where a flush occurs when there was a DCache miss and subsequent dependent instructions are cancelled or there was a branch wrong and this instruction is down a wrong speculatively path. Examples of conditions for the DFU 221 are the OF detected; UF detected; special input NaN-Zero-Infinity; UF detected; Exp in xmax range—intermediate exponent is equal to the maximum exponent but within range; Exp in xmin range—intermediate exponent is equal to the minimum exponent but within range; extreme clamping; loss of quantum—result does not have the expected exponent value or is inexact.

Additionally, the DFU 221 can perform an internal opcode compare operation that forms a fourth mark, mark4, comprising its own set of conditions. This fourth mark is associated with its own workaround triggering signal that is generated when an instruction with the fourth mark and having its associated conditions satisfied. The internal opcode compare operation of the DFU 221 comprises class groups and a 12-bit opcode compare with limited masking.

In an embodiment where the DFU 221 monitors for pairs of instructions with given marks, the DFU 221 across multiple pipelines so multi-cycle operations can be compared against pipelinable operations. Pairs can be formed between the same marks (e.g., colors), different colors, or the internal opcode detected by the DFU 221. For example, pairs can be internal-internal, red-internal, red-blue, and blue-green. These pairs that the DFU 221 monitors for are programmable as well as the order the marks need to occur. If the internal opcode compare is utilized in the DFU 221, it is second in a pair, and it also allows a pair to be formed using only one opcode compare slot from the IDU 221. In one embodiment, a pair detect reuses the conditions from the internal opcode compare mechanism to save latches.

Figure 3:
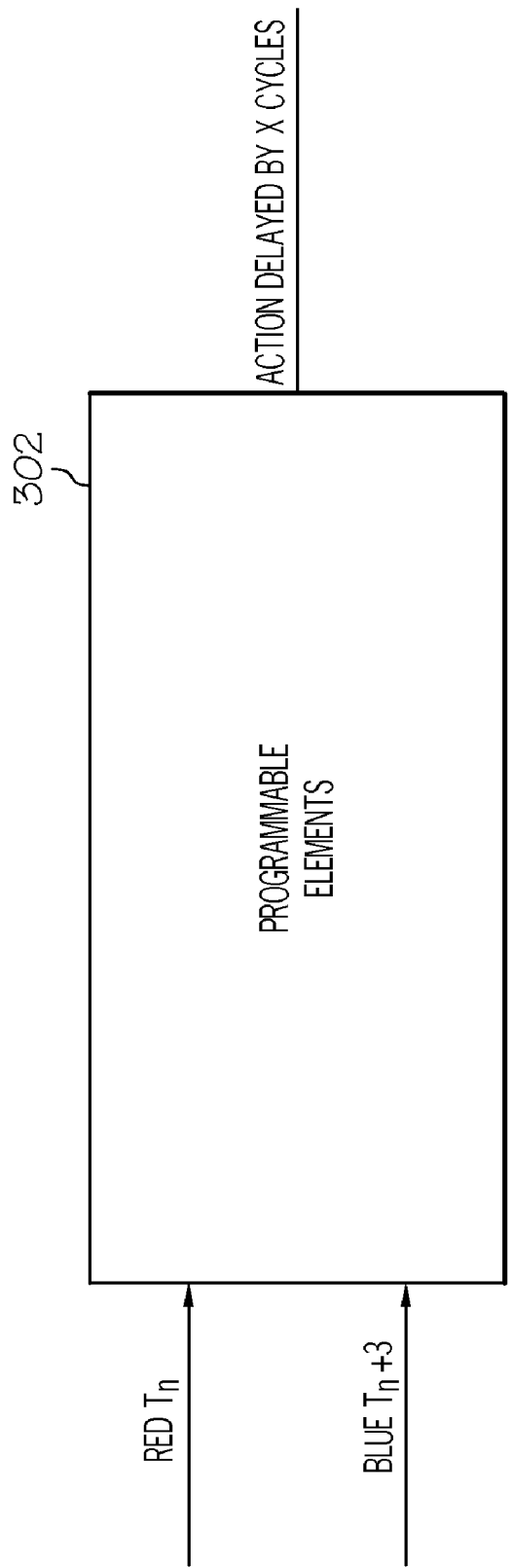
FIG. 3 is a block diagram illustrating an overview of programmable elements for delay a workaround action when marked instructions are detected in a pipeline according to one embodiment of the present invention.

It should be noted that the workaround actions performed by the BFU 219 and DFU 221 discussed above can be delayed. For example, FIG. 3 shows one or more programmable elements 302 that can delay uses of these trigger signals of the BFU/DFU by a programmable amount of cycles later. As can be seen from FIG. 3 an instruction with a red pattern is received at time Tn. Three cycles later another instruction is received with a blue pattern at time Tn+3. The execution unit is configured to identify this pairing and perform a workaround action when this pairing is detected. However, instead of immediately performing this workaround action, the programmable elements delay this action for a given/selectable amount of time. The programmable elements 302 can be included within the execution units 216, 218, 220, or the ISU 214.

In addition to the IDU 212 comprising opcode compare logic 232, the GCT 238 can also comprise opcode compare logic 236 as well. In this embodiment, a plurality of A, B opcode compare registers 238 are coupled to the GCT opcode compare logic 236. The actions that are taken, i.e., completion actions such as a reset action (XCOND) and force the processor into a mode of execution, in response to opcode compares at the GCT 222 are coupled with completion status signals received from the execution units 216, 218, 220.

Table 2 below shows one example of Opcode A information and Opcode B information for the GCT opcode compare. In particular, Table 2 shows examples of various bit assignments for a 64-bit word in the opcode compare registers 238.

TABLE 2

| Bits | Value | Mnemonic |
|---|---|---|
| | | Opcode A |
| 0:11 | | 12-bit internal Opcode A |
| 12:23 | | 12-bit mask for Opcode A |
| 24:26 | | Opcode A Action |
| | 000 | No action (control trace only) |
| | 001 | Force to millicode, not performed in millimode |
| | 010 | XCOND after |
| | 011 | XCOND after, arch serialize |
| | 100 | XCOND before, need hang breaker |
| | 101 | XCOND before, single scalar, need hang breaker |
| | 110 | XCOND before, slow-mode, not performed in slow mode |
| | 111 | XCOND before, arch serialize, need hang breaker |
| 27 | | Trace start/stop function |
| 28:31 | | |
| | | Opcode B |
| 32:43 | | 12-bit internal Opcode B |
| 44:55 | | 12-bit mask for Opcode B |
| 56:58 | | Opcode B action |
| | 000 | No action (control trace only) |
| | 001 | Force to millicode, not performed in millimode |
| | 010 | XCOND after |
| | 011 | XCOND after, arch serialize |
| | 100 | XCOND before, need hang breaker |
| | 101 | XCOND before, single scalar, need hang breaker |
| | 110 | XCOND before, slow-mode, not performed in slow mode |
| | 111 | XCOND after |
| 59 | | Start/stop function |
| 60:63 | | |

As can be seen, from the above discussion, the GCT opcode actions are more actions are more closely related to completion actions where as the IDU opcode actions are at the beginning of the pipeline and can effect execution and can be finer grain. Compares in the GCT are less expensive in terms of critical timing.

Operational Flow Diagrams

Figure 4:
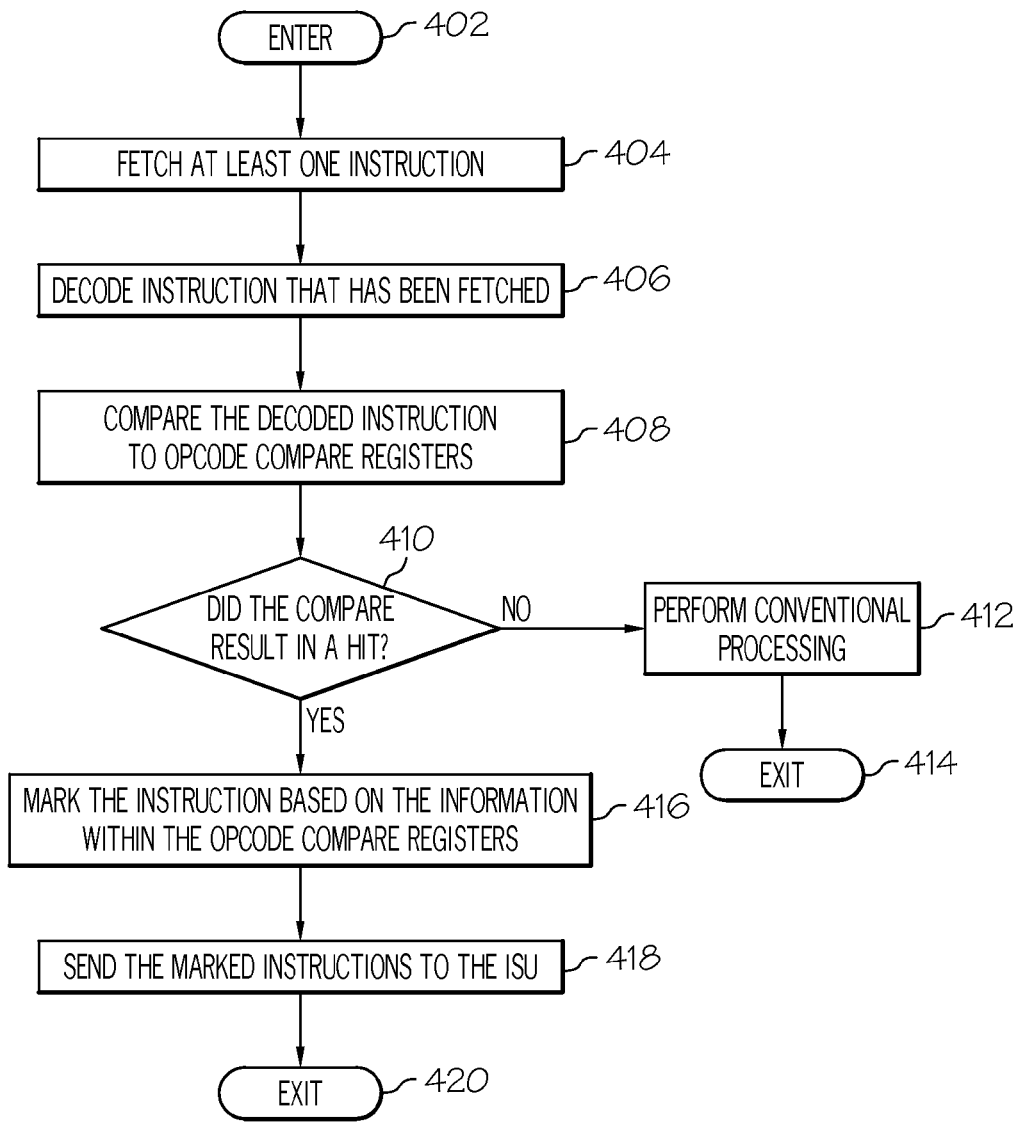
FIG. 4 is an operational flow diagram illustrating one example of marking instructions based on opcode compare operations according to one embodiment of the present invention.

FIG. 4 is an operational flow diagram illustrating one example of marking an instruction for performing workaround actions to overcome processor design flaws. The operational flow diagram of FIG. 4 begins at step 402 and flows directly into step 404. The IFU 210, at step 404, fetches at least one instruction. The IDU 212, at step 406, decodes the instruction that has been fetched. The IDU 212, at step 408, compares the decoded instruction to one or more opcode compare registers 234. The IDU 212, at step 410, determines if the comparison results in a hit. If the result of this determination is negative, conventional processing, at step 412, is performed. The control flow then exits at step 414. If the result of this determination is positive, the IDU 212, at step 416, marks the instruction based on the information within the opcode compare register(s) 234 that resulted in the hit. The IDU 212, at step 418, sends the marked instruction to the ISU 214. The control flow then exits at step 420.

Figure 5:
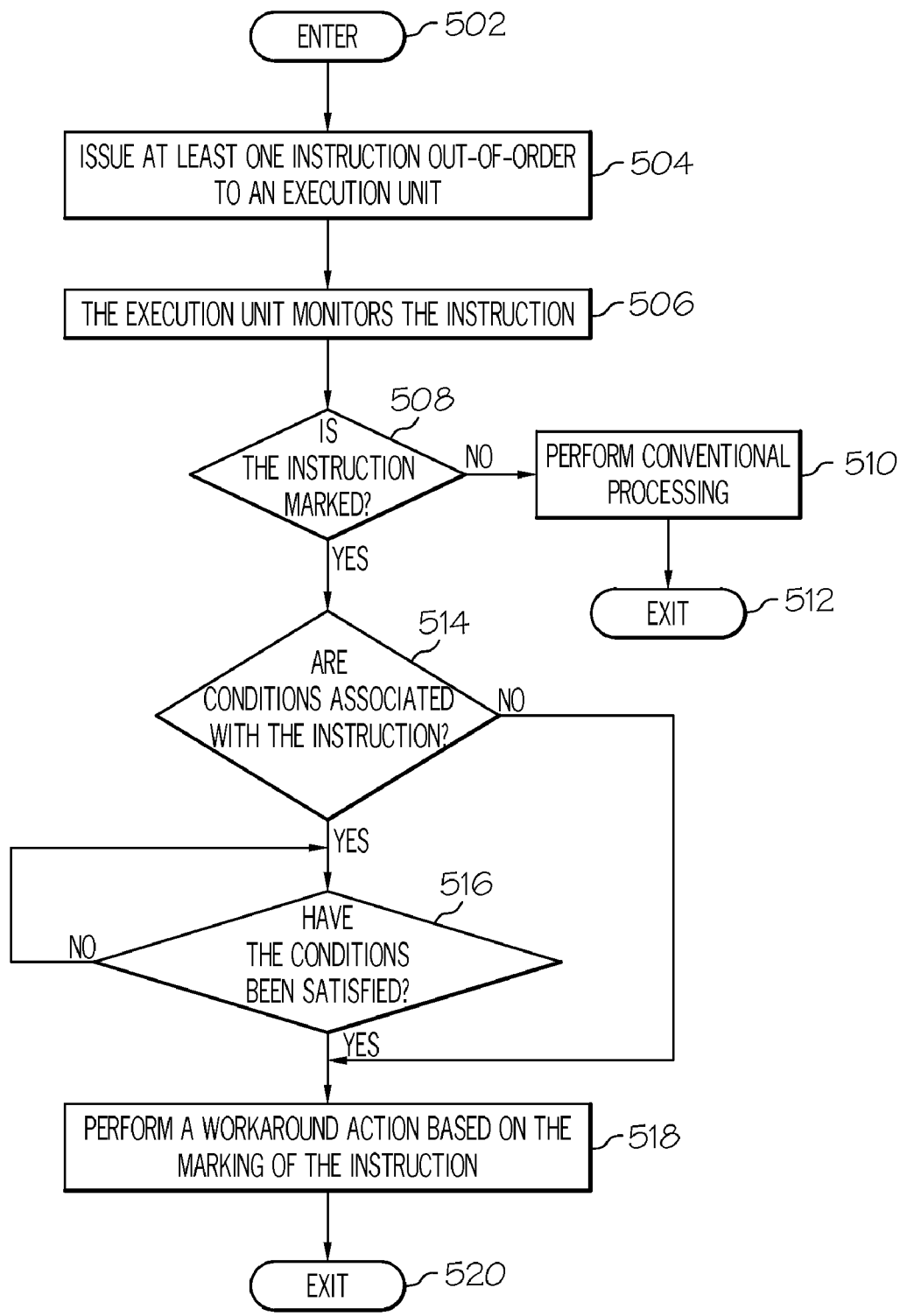
FIGS. 5-6 are operational flow diagrams illustrating various examples of marking instructions based on opcode compare operations according to one embodiment of the present invention.

FIG. 5 is an operational flow diagram illustrating another example of performing workaround actions to overcome processor design flaws. The operational flow diagram of FIG. 5 begins at step 502 and flows directly into step 504. The ISU 214, at step 504, issues at least one to an execution unit such as execution unit 218. This instruction can be issued in order or out-of-order. The execution unit 218, at step 506, monitors the instruction. The execution unit 218, at step 508, determines if the instruction is marked. If the result of this determination is negative, the execution unit 218, at step 510, performs conventional processing and the control flow exits at step 512. If the result of this determination is positive, the execution unit 218, at step 514, determines if the instruction is associated with any conditions. If the result of this determination is negative, the control flows to step 518. If the result of this determination is positive, the execution unit, at step 516, determines if these conditions have been satisfied. If the result of this determination is negative, the execution unit continues to determine if these conditions have been satisfied. If the result of this determination is positive, the execution unit 218, at step 518, performs one or more workaround actions based on the marking of the instruction. The control flow then exits at step 520.

Figure 6:
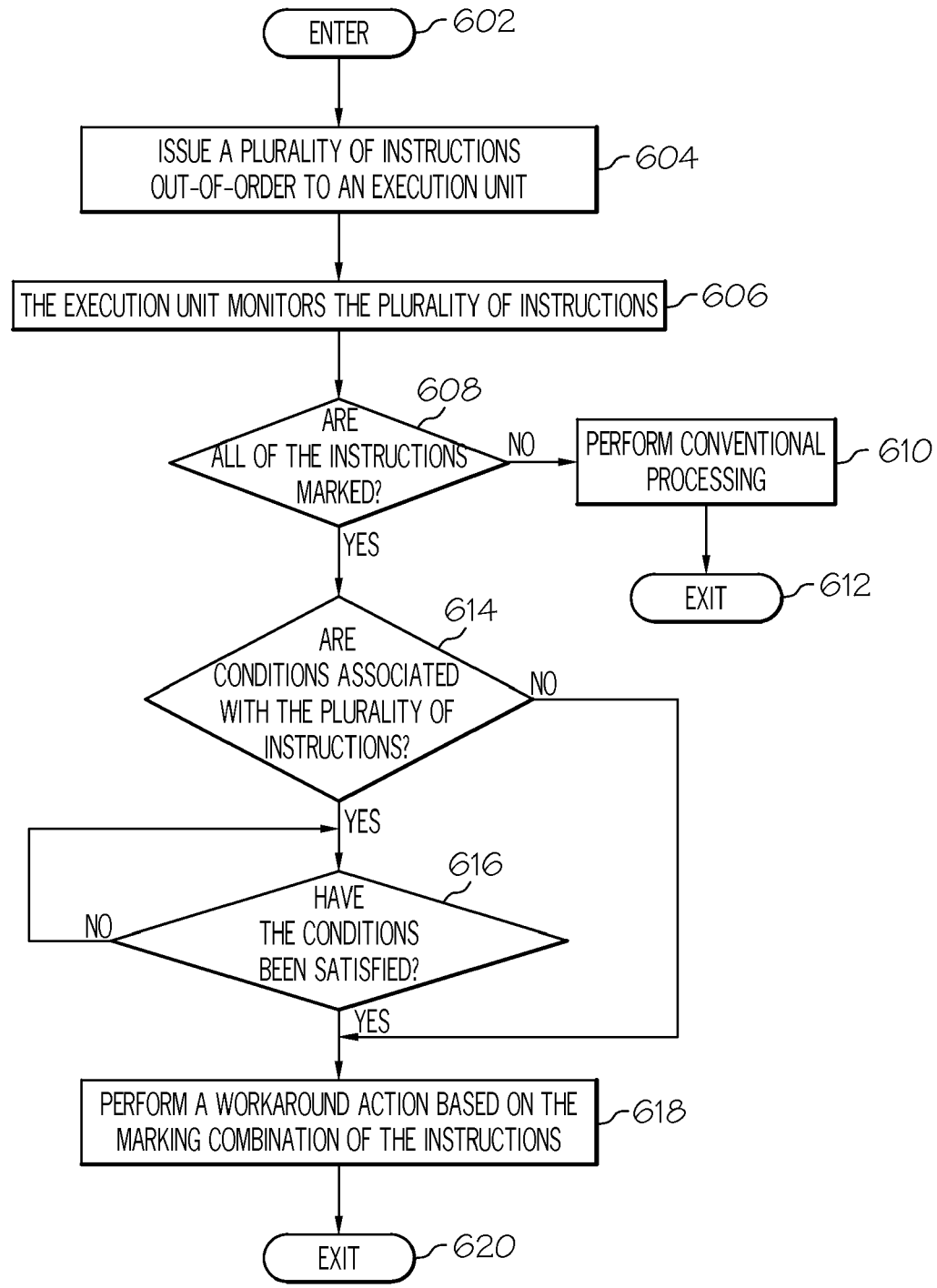

FIG. 6 is an operational flow diagram illustrating another example of performing workaround actions to overcome processor design flaws. The operational flow diagram of FIG. 6 begins at step 602 and flows directly into step 604. The ISU 214, at step 604, issues a plurality of instructions to an execution unit such as execution unit 218. These instructions can be issued in order or out-of-order. The execution unit 218, at step 606, monitors the plurality of instructions. The execution unit 218, at step 608, determines if two or more of the instructions match a pairing pattern. For example, the execution unit 218 determines if the instructions match a pariting pattern such as, but not limited to, instruction1 marked color1 and instruction2 marked color2 and separated in time by 3 cycles. If the result of this determination is negative, the execution unit 218, at step 610, performs conventional processing and the control flow exits at step 612. If the result of this determination is positive, the execution unit 218, at step 614, determines if the plurality of instructions is associated with any conditions. If the result of this determination is negative, the control flows to step 618. If the result of this determination is positive, the execution unit, at step 616, determines if these conditions have been satisfied. If the result of this determination is negative, the execution unit continues to determine if these conditions have been satisfied. If the result of this determination is positive, the execution unit 218, at step 618, performs one or more workaround actions based on the marking combination of the instructions. The control flow then exits at step 620.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a program product via CD or DVD, e.g. CD 144, CD ROM, or other form of recordable media, or via any type of electronic transmission mechanism.

What is claimed is:

1. A method for working around a processing flaw in a processor, the method comprising:
fetching at least one instruction from a memory location;
decoding the at least one instruction;
performing, by a set of opcode compare logic associated with one of an instruction decode unit and a set of global completion tables, an opcode compare operation with the at least one instruction and a set of values within at least one opcode compare register in response to the decoding;

marking, based on the opcode compare operation, the instruction with a pattern, wherein the pattern indicates that the instruction is associated with a processing flaw, wherein the pattern is separate and distinct from opcode information within the instruction that is utilized by the set of opcode compare logic during the opcode compare operation.

2. The method of claim 1, further comprising:

detecting, by an the execution unit, the instruction in a pipeline associated with the execution unit;

identifying, based on the detecting, the pattern of the instruction; and performing, by the execution unit, a workaround action based on the pattern that has been identified, wherein the workaround action modifies a default processor behavior associated with the instruction to avoid the processing flaw.

3. The method of claim 2, wherein performing the work around action further comprises:

executing only the instruction in the pipeline.

4. The method of claim 2, wherein the performing the workaround action is in response to:

determining that a set of conditions associated with the instruction has been satisfied.

5. The method of claim 2, further comprising:

delaying the performing of the workaround action for a given number of cycles.

6. The method of claim 2, wherein the identifying further comprises:

receiving, by the execution unit, an encoded signal associated with the instruction from an instruction decode unit comprising an indication that the instruction is associated with the pattern.

7. The method of claim 6, wherein the performing is in response to:

determining that the instruction and the additional instruction were detected in a given order.

8. The method of claim 2, wherein the instruction has been issued out-of-order in the pipeline.

9. The method of claim 1, further comprising:

detecting, by an execution unit, the instruction in a pipeline associated with the execution unit;

detecting, by the execution unit, an additional instruction in the pipeline associated with the execution unit;

determining, based on detecting that the instruction is in the pipeline, that the instruction is associated with the pattern;

determining, based on detecting that the additional instruction is in the pipeline, that the additional instruction is associated with a pattern; and performing, by the execution unit, a workaround action based on detecting a combination of the pattern associated with the instruction and the pattern associated with the additional instruction, wherein the workaround action modifies a default processor behavior associated with the instruction to avoid the processing flaw.

10. An information processing system for working around a processing flaw in a processor, the information processing system comprising:

a memory; and a processor communicatively coupled to the memory, wherein the processor comprises an instruction fetching unit for fetching at least one instruction from a memory location, and an instruction decoding unit for decoding the at least one instruction, the processor configured to perform a method comprising;

in response to the at least one instruction being decoded, performing, by a set of opcode compare logic of one of an instruction decode unit and a set of global completion tables, an opcode compare operation with the at least one instruction and a set of values within at least one opcode compare register;

marking, based on the opcode compare operation, the instruction with a pattern, wherein the pattern indicates that the instruction is associated with a processing flaw, wherein the pattern is separate and distinct from opcode information within the instruction that is utilized by the set of opcode compare logic during the opcode compare operation; and sending, by the instruction decode unit, an encoded signal to an execution unit, wherein the encoded signal is associated with the instruction and comprises an indication that the instruction is associated with the pattern.

11. The information processing system of claim 10, wherein the processor further comprises:

at least one execution unit, wherein the execution unit is for:

detecting the instruction in a pipeline associated with the execution unit;

identifying, based on the instruction being detected, the pattern of the instruction;

and performing a workaround action based on the pattern that has been detected, wherein the workaround action modifies a default processor behavior associated with the instruction to avoid the processing flaw.

12. The information processing system of claim 11, wherein the workaround is performed is in response to:

determining that a set of conditions associated with the instruction has been satisfied.

13. The information processing system of claim 11, wherein the execution unit is further for:

delaying the performing of the workaround action for a given number of cycles.

14. The information processing system of claim 9, wherein the processor further comprises at least one execution, wherein the execution unit is for:

detecting the instruction in a pipeline associated with the execution unit;

detecting an additional instruction in the pipeline associated with the execution unit;

determining, based on the instruction being detected in the pipeline, that the instruction is associated with the pattern;

determining based on the instruction being detected in the pipeline, that the additional instruction is associated with a pattern; and performing a workaround action based on detecting a combination of the pattern associated with the instruction and the pattern associated with the additional instruction, wherein the workaround action modifies a default processor behavior associated with the instruction to avoid the processing flaw.

15. The information processing system of claim 14, wherein the execution unit performs the workaround action in response to:

determining that the instruction and the additional instruction were detected in a given order.

16. A processor for working around a processing flaw, the processor comprising at least:
   an instruction fetching unit;
   an instruction decoding unit; and
   at least one execution unit,
   wherein the instruction fetching unit is for fetching at least one instruction from a memory location,
   wherein the instruction decoding unit is for
      decoding the at least one instruction;
      performing, in response to the at least one instruction being decoded, an opcode compare operation with the at least one instruction and a set of values within at least one opcode compare register; and
      marking, based on the opcode compare operation, the instruction with a pattern, wherein the pattern indicates that the instruction is associated with a processing flaw, wherein the pattern is separate and distinct from opcode information within the instruction that is utilized by the set of opcode compare logic during the opcode compare operation.

17. The processor of claim 16, wherein the execution unit is for:
   detecting the instruction in a pipeline associated with the execution unit;
   identifying, based on the instruction being detected, the pattern of the instruction; and
   performing a workaround action based on the pattern that has been detected, wherein the workaround action modifies a default processor behavior associated with the instruction to avoid the processing flaw.

18. The processor of claim 17, wherein the workaround is performed is in response to:
   determining that a set of conditions associated with the instruction has been satisfied.

19. The processor of claim 18, wherein the execution unit is further for:
   delaying the performing of the workaround action for a given number of cycles.

20. The processor of claim 18, wherein the execution unit identifies the pattern of the instruction by:
   receiving an encoded signal associated with the instruction from an instruction decode unit comprising an indication that the instruction is associated with the pattern.

21. The processor of claim 16, wherein the execution unit is further for:
   detecting the instruction in a pipeline associated with the execution unit;
   detecting an additional instruction in the pipeline associated with the execution unit;
   determining, based on the instruction being detected in the pipeline, that the instruction is associated with the pattern;
   determining, based on the instruction being detected in the pipeline, that the additional instruction is associated with a pattern; and
   performing a workaround action based on detecting a combination of the pattern associated with the instruction and the pattern associated with the additional instruction, wherein the workaround action modifies a default processor behavior associated with the instruction to avoid the processing flaw.

* * * * *